US008419346B2

(12) United States Patent
Attey (10) Patent No.: US 8,419,346 B2
(45) Date of Patent: Apr. 16, 2013

(54) WIND TURBINE (75) Inventor: Graeme Scott Attey, South Fremantle (AU)

(73) Assignee: Design Licensing International Pty Ltd, Western Austrailia (AU)

( * ) Notice: Subject to any disclaimer, the term of this patent is extended or adjusted under 35 U.S.C. 154(b) by 9 days.

(21) Appl. No.: 12/940,903

(22) Filed: Nov. 5, 2010

(65) Prior Publication Data
US 2011/0070087 A1 Mar. 24, 2011

Related U.S. Application Data (63) Continuation of application No. PCT/AU2009/000567, filed on May 7, 2009.

(30) Foreign Application Priority Data

May 7, 2008 (AU) ................................. 2008902218
May 26, 2008 (AU) ................................. 2008902592

(51) Int. Cl.
*F03D 3/02* (2006.01)
(52) U.S. Cl.
USPC ............. 415/4.2; 415/4.4; 415/907; 416/182; 416/DIG. 6
(58) Field of Classification Search ............ 415/4.2, 415/4.3, 4.4, 4.5, 905, 907, 908; 416/182, 416/DIG. 6; 290/55
See application file for complete search history.

(56) References Cited

U.S. PATENT DOCUMENTS

| 1,574,171 | A |   | 2/1926 | Ryan |   |
|---|---|---|---|---|---|
| 3,070,287 | A |   | 12/1962 | Bruno |   |
| 4,162,410 | A |   | 7/1979 | Amick |   |
| 4,245,958 | A | * | 1/1981 | Ewers | ...................... 416/197 A |
| 4,247,251 | A |   | 1/1981 | Wuenscher |   |
| 4,379,972 | A |   | 4/1983 | Sosa et al. |   |
| 4,430,044 | A |   | 2/1984 | Liljegren |   |
| 4,452,568 | A |   | 6/1984 | Andersson |   |
| 4,486,143 | A |   | 12/1984 | McVey |   |
| 4,857,753 | A | * | 8/1989 | Mewburn-Crook et al. | ..... 290/55 |

(Continued)

FOREIGN PATENT DOCUMENTS

EP 0046370 A1 2/1982
GB 561435 A 5/1944

(Continued)

OTHER PUBLICATIONS

European Patent Application No. 07815663.5 filed Dec. 4, 2007 in the name of Design Licensing International Pty Ltd, Supplemental European Search Report mailed Sep. 22, 2010.

(Continued)

*Primary Examiner* — Edward Look
*Assistant Examiner* — Jason Davis
(74) *Attorney, Agent, or Firm* — Levine Bagade Han LLP (57) ABSTRACT

A wind turbine arranged to operate in confined area is disclosed. The wind turbine is constrained within two axially displaced end plates and diametrically opposed wind barriers. The wind barriers are parallel to the axis and extend between end plates. The wind barriers each having an axially extending inner edge radially spaced from an outer swept surface of the turbine blades by less than 20% of the turbine radius. In another embodiment, there is disclosed a 2-dimensional array of wind turbines, with wind barriers being arranged between parallel axes.

21 Claims, 10 Drawing Sheets

U.S. PATENT DOCUMENTS

| | | | |
|---|---|---|---|
| 5,076,759 A * | 12/1991 | Schonell | 416/119 |
| 5,380,149 A * | 1/1995 | Valsamidis | 415/2.1 |
| 5,527,151 A | 6/1996 | Coleman et al. | |
| 5,642,984 A * | 7/1997 | Gorlov | 416/176 |
| 6,097,104 A | 8/2000 | Russell | |
| 6,155,892 A | 12/2000 | Gorlov | |
| 6,172,429 B1 | 1/2001 | Russell | |
| 6,201,313 B1 | 3/2001 | Nakamats | |
| 6,293,835 B2 | 9/2001 | Gorlov | |
| 6,309,172 B1 * | 10/2001 | Gual | 415/4.4 |
| 6,638,005 B2 * | 10/2003 | Holter et al. | 415/4.2 |
| 6,740,989 B2 * | 5/2004 | Rowe | 290/55 |
| 6,784,566 B2 * | 8/2004 | Thomas | 290/55 |
| 6,814,070 B2 | 11/2004 | Bourne et al. | |
| 6,877,948 B2 | 4/2005 | Cutcher | |
| 6,966,747 B2 | 11/2005 | Taylor et al. | |
| 7,008,171 B1 * | 3/2006 | Whitworth | 415/4.2 |
| 7,109,599 B2 | 9/2006 | Watkins | |
| 2003/0025335 A1 | 2/2003 | Elder | |
| 2003/0209911 A1 | 11/2003 | Pechler | |
| 2003/0231951 A1 | 12/2003 | Kaare | |
| 2004/0105754 A1 | 6/2004 | Takahashi | |
| 2005/0099013 A1 | 5/2005 | Noguchi | |
| 2007/0224029 A1 | 9/2007 | Yokoi | |

FOREIGN PATENT DOCUMENTS

| | | |
|---|---|---|
| GB | 2000556 A | 1/1979 |
| GB | 2049066 A | 12/1980 |
| GB | 2404700 A1 | 2/2005 |
| JP | 55-142978 A | 11/1980 |
| JP | 2001193631 A2 | 7/2001 |
| JP | 2002021705 A2 | 1/2002 |
| JP | 2003065206 A2 | 3/2003 |
| JP | 2004019537 A2 | 1/2004 |
| JP | 2005036649 A | 2/2005 |
| NL | 1019855 C2 | 12/2002 |
| WO | WO 94/03725 | 2/1994 |
| WO | WO 2005/028861 | 3/2005 |
| WO | WO 2005/116446 | 12/2005 |
| WO | WO 2006/095369 | 9/2006 |
| WO | WO 2007027113 A1 * | 3/2007 |
| WO | WO 2008/067593 | 6/2008 |
| WO | WO 2009/135261 | 11/2009 |

OTHER PUBLICATIONS

PCT International Patent Application No. PCT/AU2007/001865 filed Dec. 4, 2007 in the name of Attey, International Search Report mailed May 8, 2008.

PCT International Patent Application No. PCT/AU2009/000567 filed May 7, 2009 in the name of Attey, International Search Report mailed Aug. 24, 2009.

U.S. Appl. No. 12/478,597, filed Jun. 4, 2009 in the name of Attey et al., Non-final Office Action mailed Sep. 24, 2010.

* cited by examiner

WIND TURBINE

CROSS-REFERENCE TO RELATED APPLICATIONS

This application is a continuation of International Patent Application No. PCT/AU2009/000567 filed May 7, 2009 which claims benefit of priority to Australian Patent Application Nos. 2008902218 filed May 7, 2008 and 2008902592 filed May 26, 2008, the contents of which are incorporated herein by reference in their entirety.

FIELD OF THE INVENTION

The present invention relates to wind turbines. More particularly, it relates to wind turbines having an axis of rotation generally perpendicular to wind direction. Such turbines are generally designated as cross-flow turbines. They are also referred to as 'vertical axis' turbines, although this terminology can be misleading.

BACKGROUND OF THE INVENTION

Wind turbines can be generally divided into two types: 'horizontal axis' wind turbines (HAM) having an axis of rotation arranged to be aligned with prevailing wind direction; and cross-flow or 'vertical axis' wind turbines (VAWT) having an axis of rotation arranged to be generally perpendicular to the prevailing wind direction.

Within the VAWT category, turbines generally fall into one of two further categories: drag-type and lift-type.

Drag-type turbines, of which the most well known is the Savonius wind turbine, operate by having blades which each have a greater drag when moving with the wind than when moving into the wind. This difference in drag, induces a torque about an axis, causing rotation of the blades about the axis. Lift-type turbines, such as Darrieus turbines, use airflow about the blades to generate a lift force on the blades, which is translated into rotational movement.

Drag-type blades are necessarily limited to travelling slower than the prevailing winds. Lift-type blades, however, can reach a tip speed ratio (velocity of blade tip:prevailing wind velocity) well in excess of 1.0.

Lift-type VAWT are generally significantly more efficient in producing power than drag-type VAWT. Nonetheless, various problems have been experienced in producing efficient VAWT for commercial applications.

One problem is in turbine start-up, and operation in light winds. Lift-type turbines rely on the lift provided by the rotating blade—thus rotation of the turbine requires a certain speed to be self sustaining. This may require the provision of a motor to start the turbine. Similarly, if the wind speed is not sufficient to maintain the minimum turbine rotation speed, the turbine will stop.

Another problem experienced is in spacing turbines. Wind turbines generally operate best in 'clear' air, without nearby obstacles which could act to slow wind flow. For this reason, it is generally necessary to space wind turbines so that they do not interfere with each other's air flow. The applicant's currently pending international patent application number PCT/AU2007/001865 seeks to overcome the first of these problems by incorporating drag-type turbine features into a lift-type turbine. This is done by incorporating a cut-away or 'cupped' feature into the inner face of each turbine blade. The idea behind this concept is that the turbine will use the difference in drag between the outer and inner surfaces of the blade to generate torque at low speeds, with this torque being sufficient to accelerate the rotor to a speed where sufficient lift is generated to power the rotor.

Further research and development has demonstrated that the presence of such 'cups' has a significant impact on the aerodynamic properties of the turbine blade, resulting in a diminution of the lift generated at higher speeds. It has been established that a 50% foil cut out, as suggested in the earlier application, can result in a dropping of turbine performance by over 10%. In addition, introducing cups can lead to structural weakness in the blades, reducing blade rigidity. It has also been found that the altered air-flow resulting from the presence of cups or cut-outs can lead to increased noise.

The present invention seeks to provide a wind turbine which operates more efficiently than that disclosed in PCT/AU2007/001865. It also seeks to address the problem of spacing turbines, and to provide an arrangement whereby a number of turbines can be arranged in a compact manner.

BRIEF SUMMARY OF THE INVENTION

In accordance with a first aspect of the present invention there is provided a wind turbine having a central axis; at least a first end plate and a second end plate each mounted transversely to the axis and being arranged to rotate about the axis, the first and second end plates being axially spaced; a plurality of turbine blades extending between the first and second end plates and arranged to rotate about the axis; and at least two substantially diametrically opposed wind barriers, each wind barrier extending substantially parallel to the axis between the axial position of the first end plate and the axial position of the second end plate, the wind barriers each having an axially extending inner edge radially spaced from an outer swept surface of the turbine blades. It is preferred that the spacing of the wind barriers from the outer swept surface be about 7% of the radius of the outer swept surface, although it is anticipated that a beneficial effect may be found at spacing between 2% and 20% of the radius of the outer swept surface.

It is believed that the end plates and wind barriers combine to create a relatively high pressure air zone about the rotating blades. This, in turn, provides a relatively large pressure differential between this zone of low velocity, high pressure air and the high velocity, low pressure air passing through the turbine. As a result, air is effectively 'sucked' through the turbine.

It is also believed that the end plates, creating a physical barrier in to plane perpendicular to the direction of rotation, act to capture wind oriented in an oblique direction relative to the turbine. This means that the wind turbine can be fixed in position with its main axis in a horizontal direction, and still be effective in capturing energy from wind in almost all directions.

Each wind barrier has a windward face and a leeward face. It is preferred that angular orientation of the windward face be within 30° of radial alignment with respect to the axis. More preferably, the windward face may be substantially radially aligned with the axis. Similarly, the leeward face is preferably within 30° or radial alignment with respect to the axis, and is more preferably substantially radially aligned with the axis. In other words, the most preferable arrangement is for the wind barrier to be formed by a plate which is radially oriented. In this arrangement, the axially extending inner edge is most preferably square to the plate, and presents a sharp edge to incoming wind flow. The plate may advantageously be quite thin, less than 2% of the turbine radius. The plate thickness may be in the order of 3 mm. This is counter-intuitive, as all prior art known to the applicant suggests the use of angled wind deflectors to 'funnel' wind towards the turbine, creating as smooth an airflow as possible. The present invention thus achieves efficient operation by use of differential air pressure, rather than simply volume of air passing through.

A larger wind turbine can be formed by mounting a plurality of wind turbines as described coaxially, and considering each of the individual turbines as a turbine unit of the larger turbine. This may be a modular arrangement, with adjoining turbine units being connected by suitable connection means such as a locking arrangement. The wind barriers may be discrete members associated with a respective turbine unit, or may be continuous strip members arranged along a length of the larger turbine. It is preferred that the angular orientation of turbine blades on adjoining turbine units be relatively offset. This will provide a smoother torque to an axially mounted generator.

The turbine may be arranged with its axis horizontal or vertical (or, indeed, at another angle). Where the turbine is arranged with a vertical axis, it may be provided with means to locate the wind barriers substantially perpendicular to wind flow. In a simple embodiment, this means may be vanes attached to the leeward side of the wind barriers.

In a second aspect of the present invention there is provided a wind energy capture device comprising a plurality of turbines as described hereinbefore, the turbines being arranged with respective axes parallel and spaced from each other by a distance greater than twice the radius of the outer swept surface of each turbine, and preferably less than four times the radius of the outer swept surface of each turbine. Wind barriers are arranged such that their axial extending inner edges are located in a plane defined by the respective axes. Preferably the wind barriers are arranged such that each wind barrier located between turbines has an inner axial extending edge and an outer axial extending edge with respect to a first of the turbines, with the outer axial extending edge acting as an inner axial extending edge with respect to a second of the turbines. This aspect recognises that the operation of an individual turbine will not have a significant effect on the air pressures about a neighbouring turbine. This is in contrast to known turbines requiring a large volume of air, where the turbines must be well spaced to ensure each is in 'clear' air.

Preferably, neighbouring turbines are arranged to counter-rotate. The wind energy capture device may be formed by an array of wind turbines, with a plurality of coaxial turbines located on each of the parallel axes. In accordance with a third aspect of the present invention there is provided a wind turbine having a plurality of blades arranged for rotation about a central axis, each blade being oriented substantially parallel to the axis, each blade having an inner surface oriented towards the axis and an outer surface oriented away from the axis, at least one blade having an aerofoil shape with continuously curved outer and inner surfaces, such that as the blade rotates about the axis lift is generated on the blade, the blade being asymmetrical with the outer surface being convex and the inner surface being concave at least in part. In a preferred embodiment, the inner surface is concave along its length, from a leading edge of the blade to a trailing edge of the blade, with a radius of curvature greater than that of the distance from the axis to the outermost point of the inner surface. The outer surface is convex, with a radius of curvature away from the leading edge about the same as the distance from the axis to an outermost point of the outer surface, and having a centre of curvature forward of the axis. This effectively tilts the blade, increasing the angle of attack when moving into the wind. The arrangement is such that the mean camber line is substantially perpendicular to the turbine radius at the leading edge of the blade, and curves inwardly relative to the axis towards the trailing edge of the blade.

BRIEF DESCRIPTION OF THE SEVERAL VIEWS OF THE DRAWINGS

It will be convenient to further describe the invention with reference to preferred embodiments of the wind turbine of the present invention. Other embodiments are possible, and consequently, the particularity of the following discussion is not to be understood as superseding the generality of the preceding description of the invention. In the drawings.

DETAILED DESCRIPTION OF THE INVENTION

Figure 1:
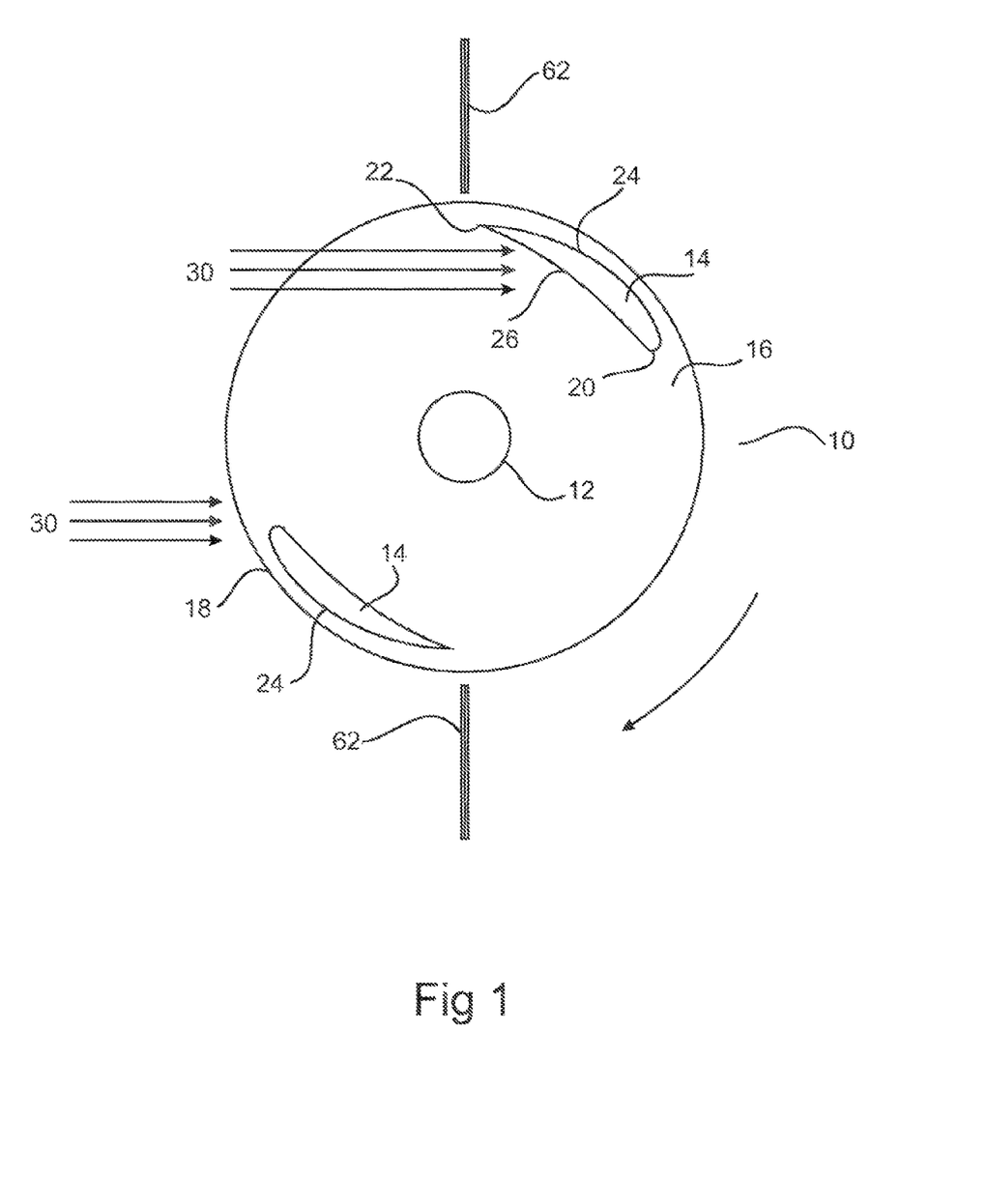
FIG. 1 is a cross sectional side view of a wind turbine unit in accordance with the present invention.

FIG. 1 shows a cross-section of a wind turbine unit 10. The wind turbine unit 10 of this embodiment has an axle 12 located about a central axis, two blades 14 and two end plates 16.

The end plates 16 are parallel, circular, and centred around the axle 12. In cross section they define an outer circumference 18 of the wind turbine unit 10. The distance from the central axis to this outer circumference can be considered the turbine radius.

The turbine unit 10 has a first end plate 16 and a second endplate 16, which are axially spaced and act to define a first axial end and a second axial end of the turbine unit 10. Turbine blades 14 extend between the first and second end plates 16. As the end plates 16 rotate about the axis, the blades 14 thus also rotate about the axis.

The blades 14 are diametrically opposed about the axle 12. Each blade 14 has a leading edge 20 and a trailing edge 22, connected by an outer surface 24 and an inner surface 26. The blade 14 has an asymmetrical aerofoil shape in cross section, with the outer surface 24 acting as a low pressure surface and the inner surface 26 acting as a high pressure surface. Movement of the blades 14 through the air thus creates lift acting generally away from the axle 12.

The outer surface 24 comprises a continuous convex curve. The radius of curvature of the outer surface 24 is substantially equal to the distance between the turbine axis and the outermost part of the outer surface 24, except adjacent the leading edge 20 where the outer surface curves to present a characteristic leading edge shape. The centre of curvature of the outer surface 24 is forward of the turbine axis. In other words, the outer surface 24 is 'tilted' relative to a circumferential orientation so as to increase the angle of attack of the blade 14 when moving into the wind. As such, the distance between outer surface 24 of the blade 14 and the outer circumference 18 of the wind turbine unit 10 is greater at the trailing edge 22 than at the leading edge 20. The inner surface 26 comprises a continuous concave curve, having a radius of curvature greater than the turbine radius. This results in the blade 14 being bulbous in shape, with both inner and outer surfaces having centres of curvature on the inner side of the blade 14.

The mean camber line, being the curve between the leading edge 20 and the trailing edge 22 midway between the outer and inner surfaces, is substantially tangential to the central axis at the leading edge 20, and has a decreasing radius of curvature towards the trailing edge 22.

The blades 14 are located such that the radially outermost part of the outer surface 24 is near the outer circumference 18 of the wind turbine unit 10. When the blades 14 rotate about their axis, they thus define an outer swept surface which is cylindrical in shape, with a radius close to but slightly less than the turbine radius.

FIG. 1 shows wind flow 30 acting on the blades 14. Where the tip speed ratio (TSR) is less than one, the wind will cause a drag force on whichever surface of the blade 14 is facing the wind. As shown in FIG. 1, this is on the inner face of the upper blade 14 and on the outer face of the lower blade 14. The concave curve on the inner face 26 provides a much larger drag than the convex curve on the outer face 24. As a result of this difference in drag, a torque is created around about the axle 12, causing rotation of the blades in a clockwise direction as viewed in the orientation of FIG. 1.

As the blades rotate, additional lift and drag forces are generated by air flow relative to the aerofoil shape of the blades 14. The lift forces act through a line ahead of the axis, and thus provide a torque to the axle 12 greater than the opposite torque generated by the drag. This torque accelerates the blades 14 to a point where the tip speed ratio can be well in excess of one. In this condition the inner face of the blade 14 is moving faster than the wind speed, so the effects of air flow relative to the blade 14 from leading edge 20 to trailing edge 22 are much greater than the direct effect of wind flow 30 on the inner face 26.

Figure 2:
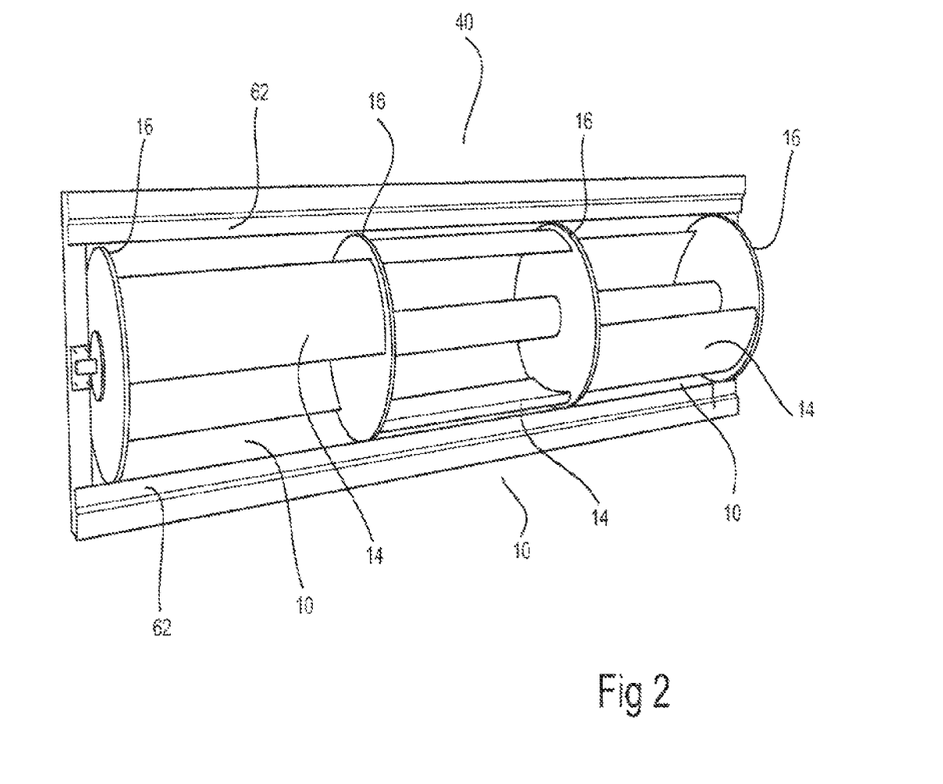
FIG. 2 is a schematic front view of a wind turbine comprising three wind turbine units as shown in FIG. 1 arranged coaxially.

FIG. 2 shows a wind turbine 40 comprising three wind turbine units 10 connected coaxially. The arrangement is such that adjoining turbine units 10 share end plates 16. In this embodiment, the blades 14 of each turbine unit 10 are angularly offset by 60° relative to the respective adjoining turbine unit. This arrangement assists to provide a smoother torque which is less susceptible to pulsation than a single turbine unit.

Figure 3:
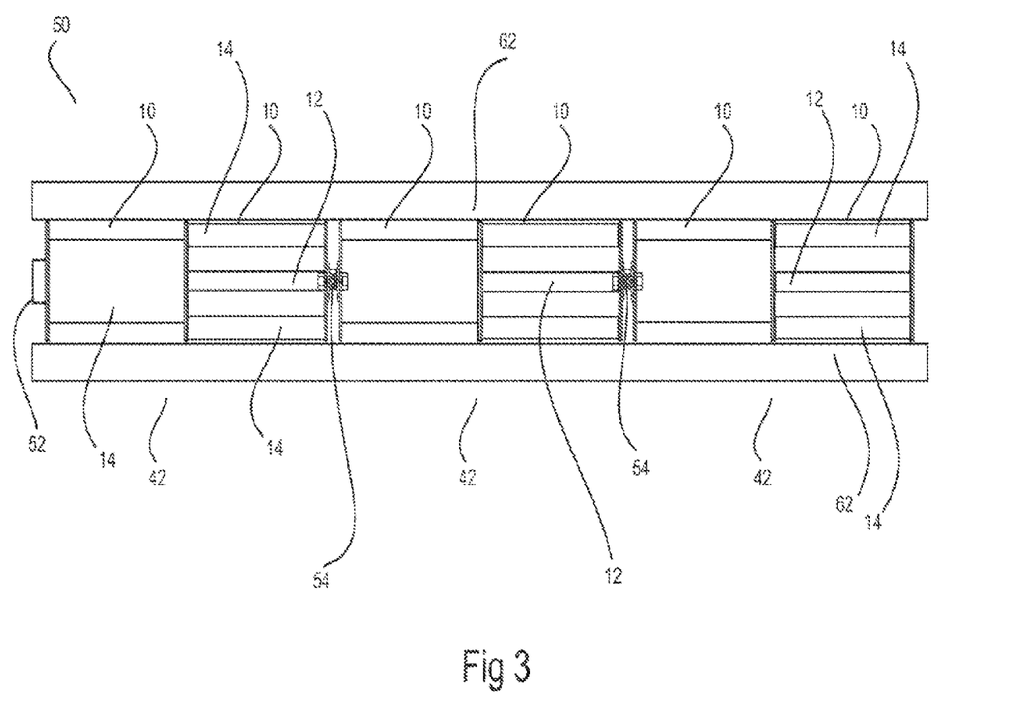
FIG. 3 is a schematic cross sectional front view of a wind energy capture device comprising six wind turbine units as shown in FIG. 1 arranged in three modules, each having two turbines units.

A larger coaxial arrangement of turbine units 10 is shown in FIG. 3. In this embodiment, a wind energy capture device 50 is a modular arrangement, having three turbine modules 42. Each of the turbine modules 42 is similar to the turbine 40 of FIG. 2, however comprises only two turbine units 10. It will be noted that the blades of adjoining turbine units are thus offset by 90°.

The wind energy capture device 50 includes a single generator 52 mounted at an axial end of the device 50. The arrangement is such that torque generated by each of the six turbine units 10 is transmitted along the axle 12 to the generator 52.

Figure 4:
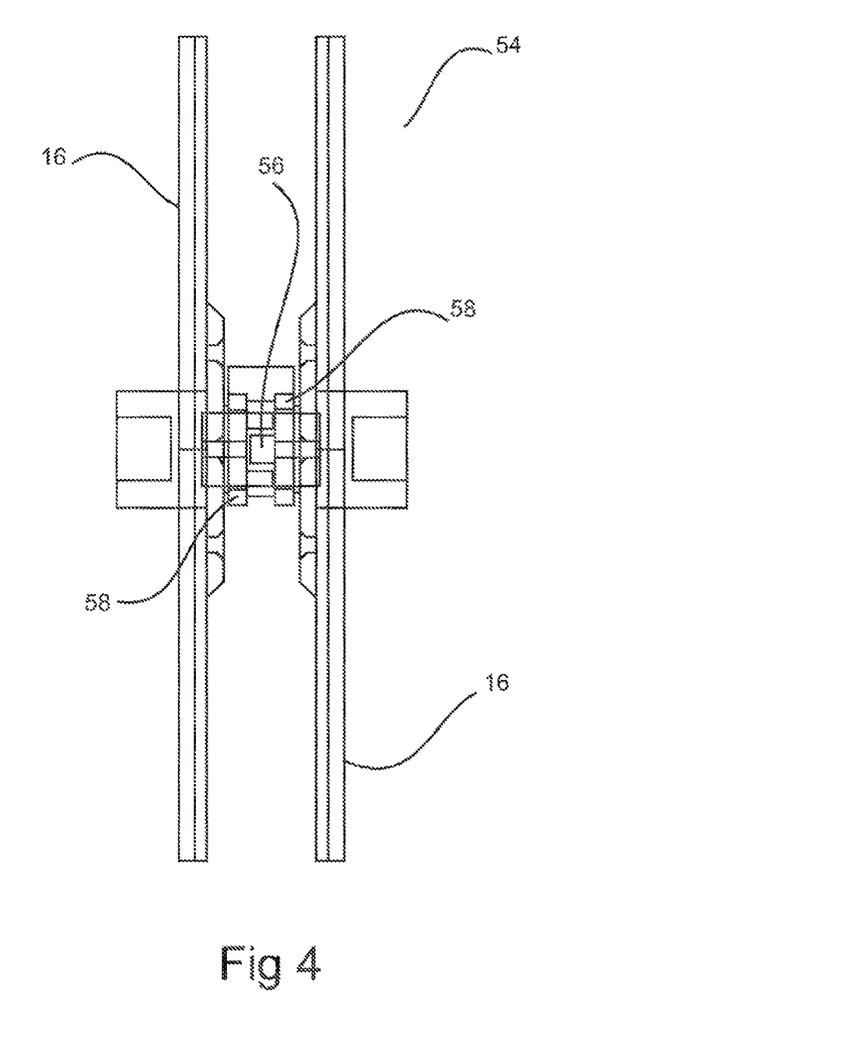
FIG. 4 is a schematic cross sectional view of a connection means within the wind energy capture device of FIG. 3.

The turbine modules 42 are joined to adjacent turbine modules 42 by a connection means. One such means is a locking arrangement 54 as shown in FIG. 4. The locking arrangement 54 comprises interlocking connectors located 56 within adjacent bearings 58. The bearings 58 can be fixed together on their exterior, such as by using a frame. It will be appreciated that this form of connection can be used to angularly offset the blades 14 of adjoining turbine modules 42, if desired.

Figure 5:
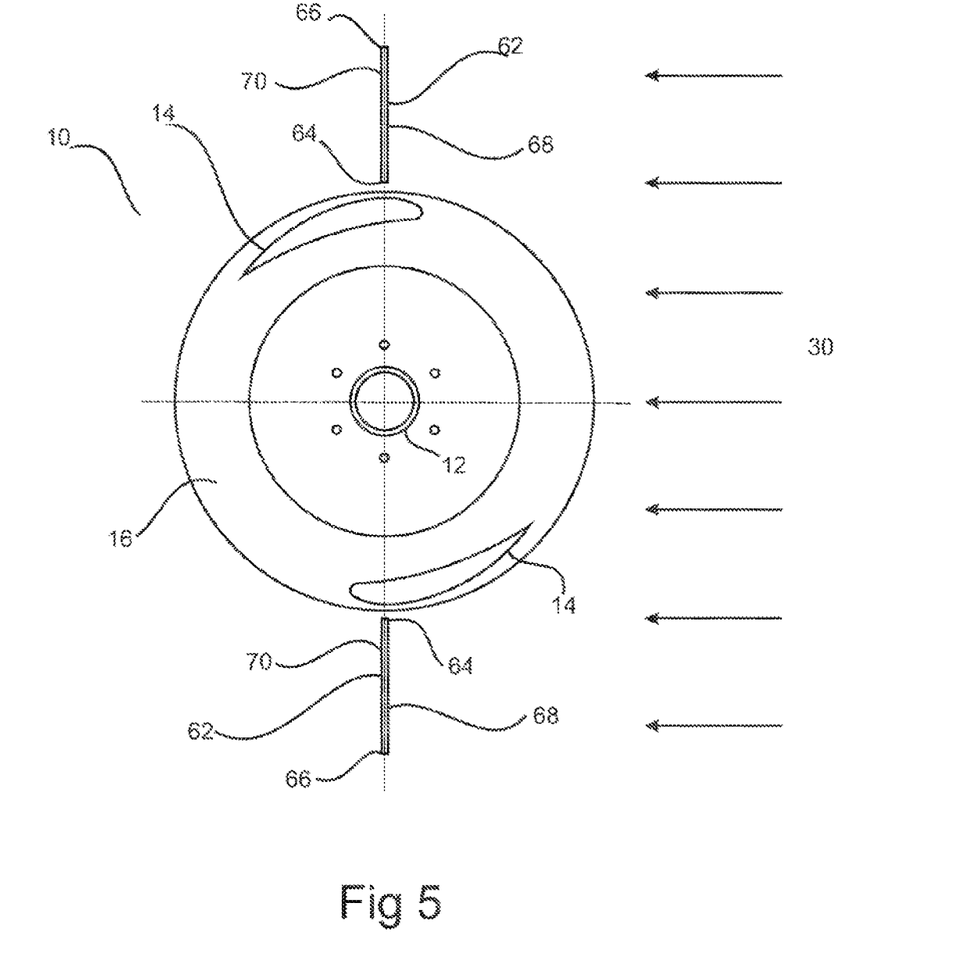
FIG. 5 is a schematic end view of the wind turbine of FIG. 1.

FIG. 5 shows a cross sectional view of the turbine unit 10 of FIG. 1, with wind barriers 62 located adjacent the turbine unit 10. The wind barriers 62 each comprise elongate plates, which extend axially along and outside the turbine unit 10 from a first end at the axial position of the first end plate 16 to a second end at the axial position of the second end plate 16. This embodiment shows two wind barriers 62, which are both oriented in a radial direction relative to the central axis and are diametrically spaced about the turbine unit 10. In the embodiments tested the wind barriers 62 have a thickness in the order of 3 mm. It is envisaged that good results will be achieved using wind barriers 62 having thickness of less than 5 mm. Acceptable results may also be found using barriers 62 having thicknesses up to about 0 mm. This is relative to a turbine radius in the order of 225 mm.

The wind barriers 62 each have an axially extending, inner edge 64 and an axially extending outer edge 66. The inner edges 64 are spaced from the wind turbine by a narrow gap, with the spacing from the blade 14 swept outer surface to a wind barrier inner edge being about 7% of the radius of the swept outer surface. In the tested embodiments discussed below, a gap of 5-35 mm has proved efficacious.

The gap between the inner edges 64 and the outer circumference 18 of the end plates 16 is less than 1% of the radius of the swept outer surface. This is in an attempt to prevent vortices rolling about the outer circumference 18.

The wind barriers 62 each have a windward side 68 and a leeward side 70. In the preferred embodiment of the drawings, both the windward site 68 and the leeward side 70 are substantially radially aligned, with the inner edge 64 being square to both the windward and leeward side 68, 70. It is preferred that the join between the inner edge 64 and the sides 68, 70 of the barrier 62 be 90° or thereabouts, rather than being bevelled or rounded. It is envisaged that the wind barriers may be oriented at an angle to the radial direction, with an offset of up to 30° either way considered possible, albeit less desirable. Consequently, in other embodiments the wind harrier may be V-shaped rather than plate like, with an included angle of up to 60°.

Figure 7A:
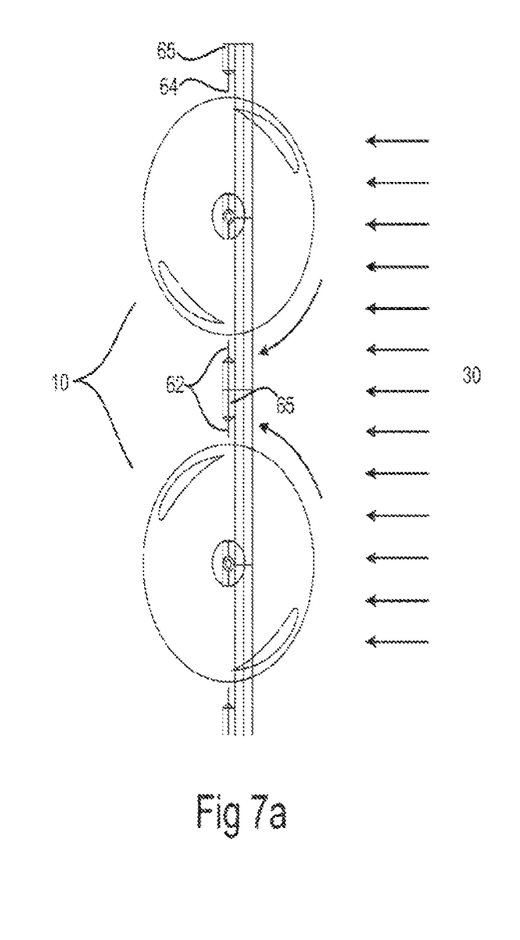
FIGS. 7(a) and 7(b) are cross sectional views of a portion of the wind energy capture device of FIG. 6, showing directions of rotation.
Figure 7B:
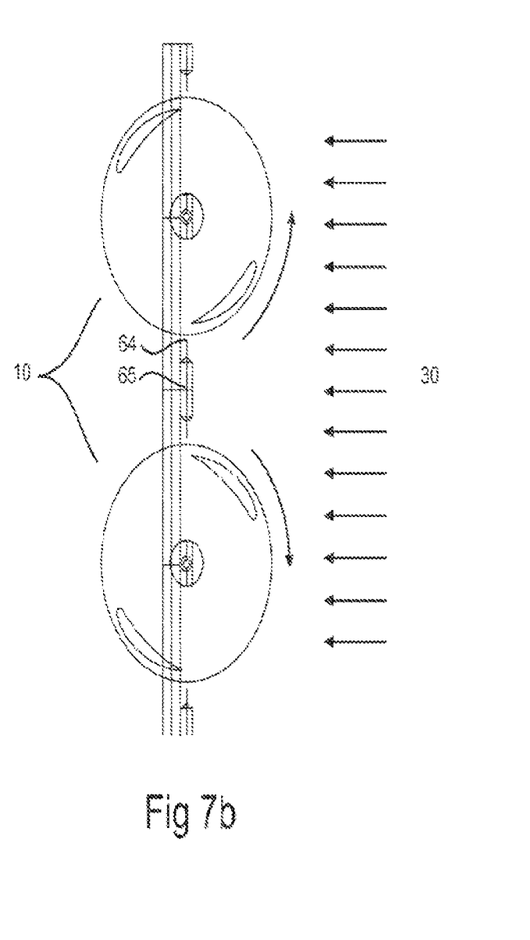

Alternatively, the wind barriers 62 may comprise a narrow portion near the inner edge 64, and a wider portion 65 spaced from the inner edge 64 in order to provide additional structural support. An example of such barriers 62 can be seen in FIG. 7.

Wind tunnel testing suggests that the presence of wind barriers 62, in conjunction with end plates 16, cause an acceleration of air flow through the turbine unit 10. In particular, tests have measured wind velocity through the turbine unit 10 to be greater than wind velocity in the 'free' air flow zones outside the outer edges 66 of the wind barriers 62.

This phenomenon is not completely understood, but it surmised that the use of flat plates, oriented substantially perpendicular to wind flow, and having a clean edge, create a zone of high air pressure about the wind turbine unit 10. The relatively low pressure within the air turbine may then act to accelerate the air passing through.

Figure 6:
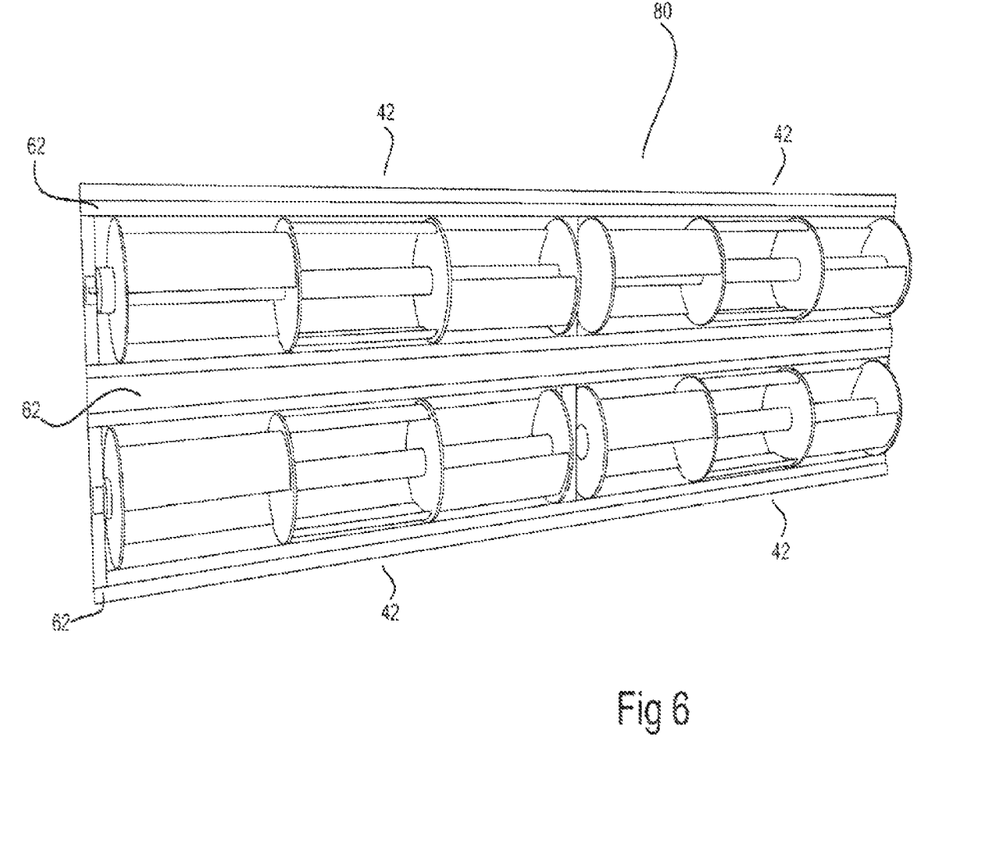
FIG. 6 is a front view of a wind energy capture device comprising a plurality of wind turbines as shown in FIG. 2 arranged in a two-dimensional array.

FIG. 6 shows a further embodiment of the present invention, being a wind energy capturing device 80 comprising four turbine modules 42 similar to those in FIG. 3. In the case of FIG. 6, however, the turbine modules are arranged in an array, with two turbine modules 42 located on each of two parallel axes.

The arrangement is such that the two axes are coplanar, with the wind barriers 62 between axes being within the plane of the axes. Each wind barrier 62 thus acts as a barrier 62 for two turbines 42 with one edge being an inner edge 64 for one turbine and an outer edge 66 for a neighbouring turbine.

Wind tunnel testing of this concept has produced surprising results. Where two turbines 40 have been tested with axes parallel, the combined turbine output has exceeded the sum of the outputs of each turbine 40 tested individually. It is surmised that this is due to more complete application of the wind pressure differential theory discussed above.

It is envisaged that neighbouring axes will be arranged to counter rotate with respect to each other. This is shown conceptually in FIG. 7.

Figure 8:
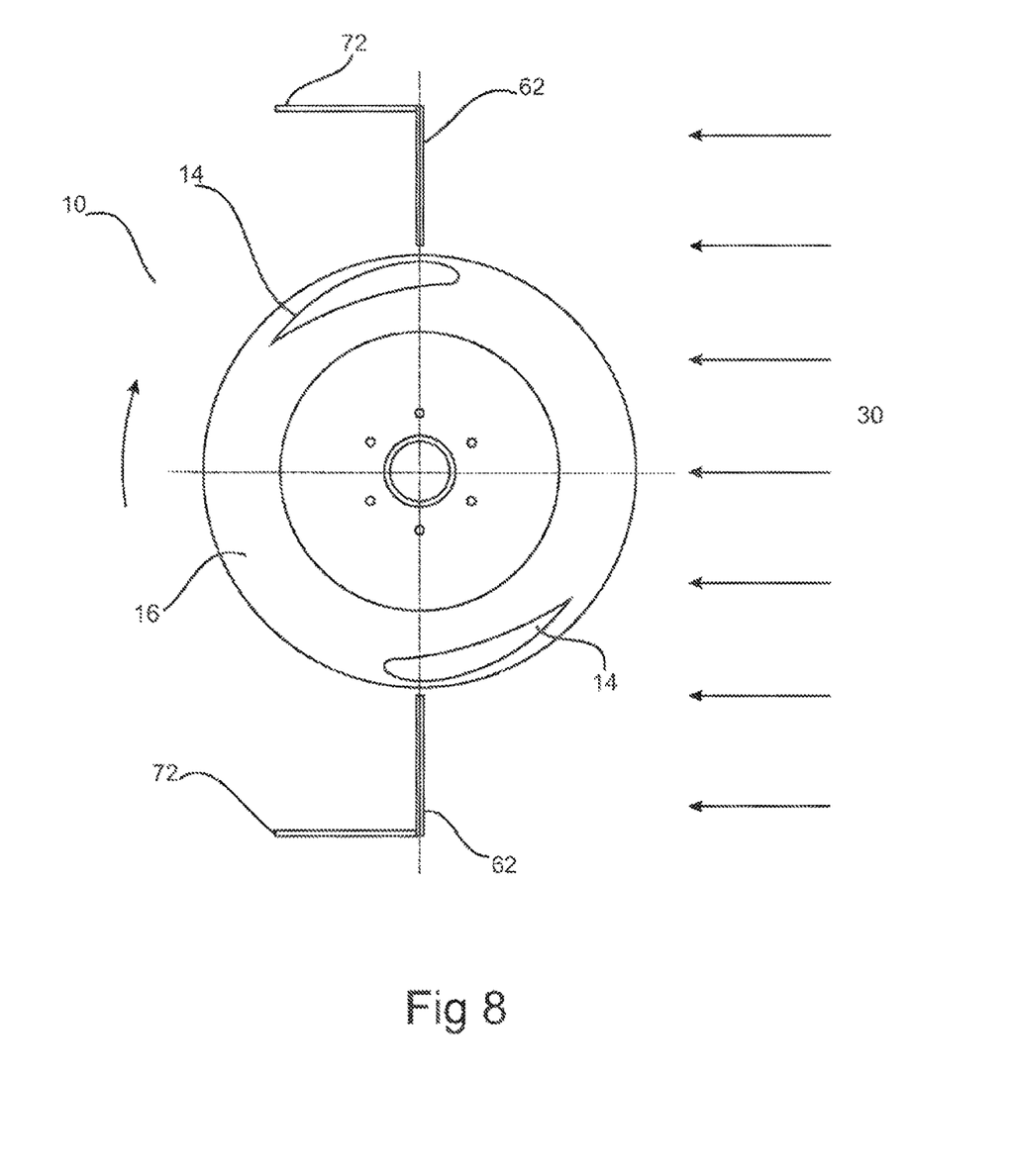
FIG. 8 is a cross sectional plan view of a wind turbine according to the present invention, arranged to be oriented vertically.

Although each of the embodiments discussed has been described in terms of the turbine axis being horizontal, it is envisaged that the turbine unit 10 can also be deployed vertically. FIG. 8 shows one such way of deploying a turbine unit 10, with wind barriers 62 being mounted about the turbine unit so as to be able to rotate about the turbine axis. The wind barriers 62 in this embodiment include guide vanes 72, which act to orient the wind barriers 62 perpendicular to the wind flow 30.

Modifications and variations as would be apparent to a skilled addressee are deemed to be within the scope of the present invention. For instance, the turbine unit may be arranged to have some blades arranged to obtain more lift when running at speeds with TSR above one, and some blade arranged to obtain more torque due in drag differentiation in low speed operation.

As indicated herein before, some of the embodiments described have been subjected wind tunnel testing.

Testing was conducted in a wind tunnel 77 measuring 2.85 m wide by 2.24 m high, supplying wind at a theoretical velocity of 4.0 $ms^{-1}$ using a tunnel fan at 20 Hz. Measurements of actual wind velocity 1 m upstream of the turbines being tested indicated actual wind velocities to be between about 3.5 $ms^{-1}$ and 4.5 $ms^{-1}$. The testing apparatus is shown schematically in FIG. 9. It comprised two wind turbines 40 located one above the other. Each of the turbines 40 comprised three turbine units 10 mounted coaxially. The turbines 40 were positioned within a vertically oriented frame 75, which included three horizontal wind barriers 62 between which the two turbines 40 were located. The frame 75 also included vertically aligned side members which, as well as providing structural support, allow the turbines 40 to be positioned within the centre of the wind tunnel 77 above the wind tunnel floor.

Figure 9:
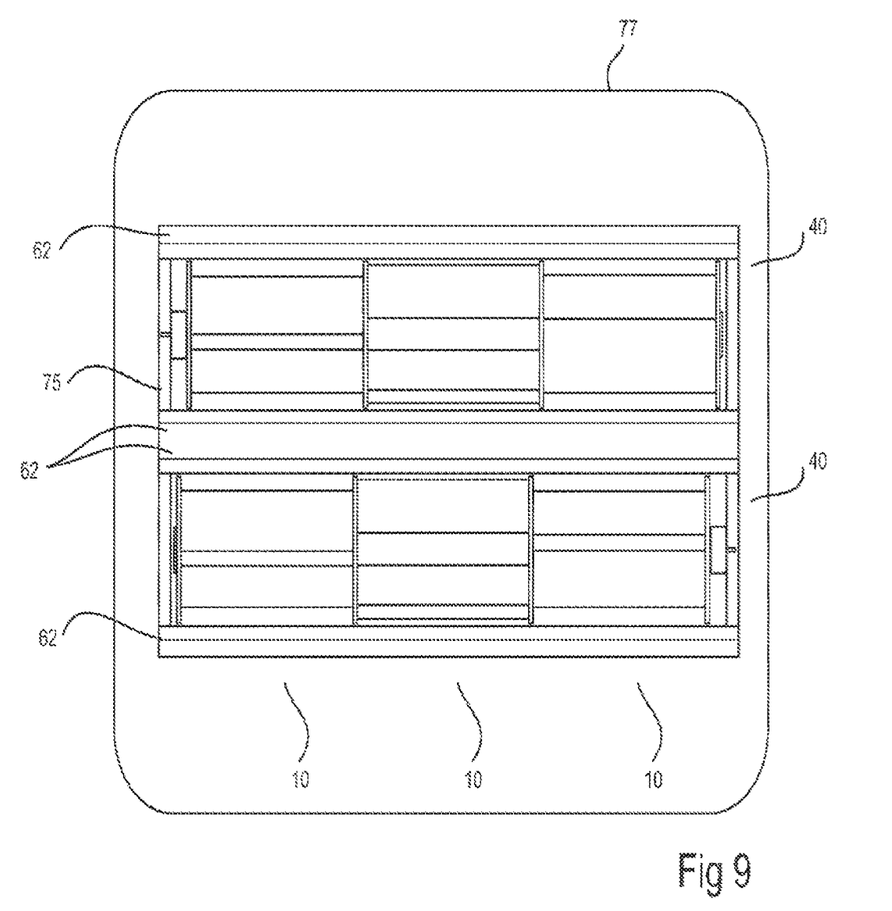
FIG. 9 is a schematic front view of testing apparatus for the present invention.
Figure 10:
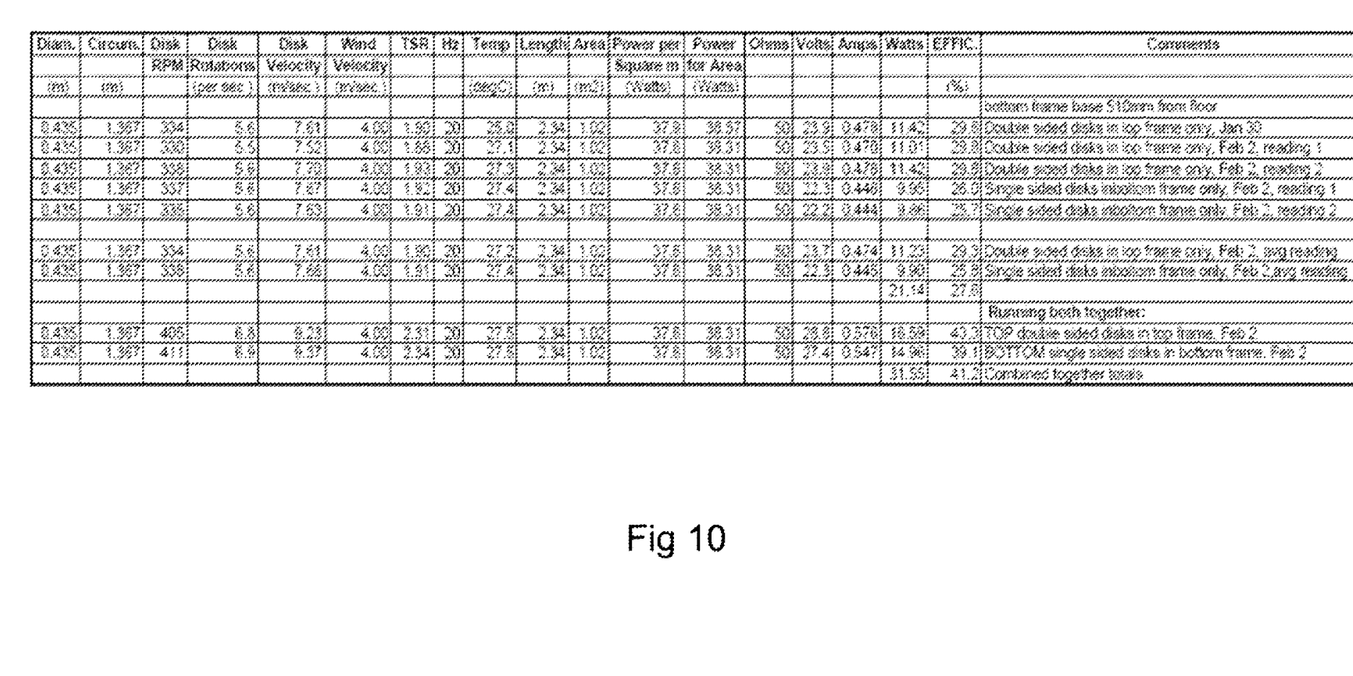
FIG. 10 is a table showing representative testing data from the apparatus of FIG. 9.

The frame 75 defined two rectangular spaces measuring 2.53 m long by 0.66 m high. The devices 40 each had an axial length of 2.34 m and a diameter of 435 mm. Three sets of tests were conducted: a set using only the upper turbine 40 and having the lower one removed (leaving an empty portion of the frame 75); a similar set using, only the lower turbine 40; and a set having both turbines 40 in position. Representative results of this testing are shown in FIG. 10, Significantly, running each turbine 40 alone, and leaving an empty portion of the frame 75, resulted in a power output per device in the order of 10 watts, with an efficiency of about 27%. Running the two turbines 40 together resulted in a total power output in the order of 30 watts, with an efficiency of about 41%.

I claim:

1. A wind energy capture device comprising: a plurality of wind turbines, each wind turbine comprising:
   a central axis;
   a first end plate and a second end plate each mounted transversely to the axis and being arranged to rotate about the axis, the first and second end plates being axially spaced;
   a plurality of turbine blades extending between the first and second end plates and arranged to rotate about the axis, wherein each turbine blade has an asymmetrical airfoil shape in cross-section, with an outer surface and an inner surface such that movement of the turbine blades through air creates lift acting generally away from the axis; and
   two substantially diametrically opposed wind barriers, each wind barrier extending substantially parallel to the axis between the axial position of the first end plate and the axial position of the second end plate, the wind barriers each having an axially extending inner edge radially spaced from an outer swept surface of the turbine blades;
   wherein the wind turbines are arranged with respective axes parallel and spaced from each other by a distance greater than twice the radius of the outer swept surface of each turbine, and
   wherein the wind barriers are arranged such that the axial extending inner edges of the wind barriers are located in a plane defined by the respective turbine axes; and
   wherein the wind barriers are arranged such that each wind barrier located between turbines has an inner axial extending edge and an outer axial extending edge with respect to a first of the turbines, with the outer axial extending edge acting as an inner axial extending edge with respect to a second of the turbines.

2. The wind energy capture device of claim 1, wherein the spacing of the wind barriers from the outer swept surface of each turbine is between 2% and 20% of the radius of the outer swept surface.

3. The wind energy capture device of claim 2, wherein the spacing of the wind barriers from the outer swept surface of each turbine is about 7% of the radius of the outer swept surface.

4. The wind energy capture device of claim 1, wherein each wind barrier has a windward face and a leeward face, and the angular orientation of the windward face is within 30° of radial alignment with respect to the corresponding turbine axis.

5. The wind energy capture device of claim 4, wherein the windward face is substantially radially aligned with the corresponding turbine axis.

6. The wind energy capture device of claim 4, wherein the leeward face is within 30° of radial alignment with respect to the corresponding turbine axis.

7. The wind energy capture device of claim 6, wherein the leeward face is substantially radially aligned with the corresponding turbine axis.

8. The wind energy capture device of claim 7, wherein each wind barrier comprises a plate with an axially extending inner edge square to the plate, and wherein the inner edge presents a sharp edge to incoming wind flow.

9. The wind energy capture device of claim 8, wherein the plate has as thickness less than 2% of the turbine radius.

10. The wind energy capture device of claim 1, whereby the axis of each turbine is horizontal.

11. The wind energy capture device of claim 1, whereby the axis of each turbine is vertical.

12. The wind energy capture device of claim 1, wherein the respective turbine axes are spaced from each other by a distance less than four times the radius of the outer swept surface of each turbine.

13. The wind energy capture device of claim 1, wherein neighboring turbines are arranged to counter-rotate.

14. The wind energy capture device of claim 1, wherein the wind energy capture device comprises an array of wind turbines, with a plurality of coaxial turbines located on each of the parallel axes.

15. The wind energy capture device of claim 14, wherein at least two adjoining turbines are connected by a suitable locking arrangement.

16. The wind energy capture device of claim 14, wherein the wind barriers comprise a plurality of strip members associated with a respective plurality of turbines of said plurality of coaxial turbines located on one of said parallel axes.

17. The wind energy capture device of claim 14, wherein the wind barriers comprise continuous strip members arranged along a length of the plurality of coaxial turbines.

18. The wind energy capture device of claim 14, where the angular orientation of turbine blades on adjoining turbines is relatively offset.

19. The wind energy capture device of claim 1, wherein the outer surface of each blade is convex and the inner surface of each blade is concave at least in part.

20. The wind energy capture device of claim 19, wherein the inner surface is concave along the length of the inner surface, from a leading edge of the blade to a trailing edge of the blade, with a radius of curvature at least greater than that of the distance from the axis to the outermost point of the inner surface.

21. The wind energy capture device of claim 19, wherein the outer surface is convex with a radius of curvature away from the leading edge about the same as the distance from the axis to an outermost point of the outer surface, and wherein the outer surface has a center of curvature forward of the axis.

\* \* \* \* \*

UNITED STATES PATENT AND TRADEMARK OFFICE
CERTIFICATE OF CORRECTION

PATENT NO. : 8,419,346 B2
APPLICATION NO. : 12/940903
DATED : April 16, 2013
INVENTOR(S) : Graeme S. Attey It is certified that error appears in the above-identified patent and that said Letters Patent is hereby corrected as shown below:

In the Specifications:

In column 1, line 25, please replace "(HAM) haying an axis" with --(HAWT) having an axis--

In column 1, line 35, please replace "in drag, induces" with --in drag induces--

In column 1, line 37, please replace "axis. Lift-type turbines" with
   --axis.
      Lift-type turbines--

In column 2, line 46, please replace "barrier in to plane" with --barrier in a plane--

In column 3, line 1, please replace "airflow as possible. The present invention" with
   --airflow as possible.
      The present invention--

In column 3, line 42, please replace "rotate. The wind energy" with
   --rotate.
      The wind energy--

In column 3, line 44, please replace "axes. In accordance" with
   --axes.
      In accordance--

In column 3, line 54, please replace "in part. In a preferred" with
   --in part.
      In a preferred--

In column 4, line 49, please replace "endplate 16" with --end plate 16--

Signed and Sealed this
Ninth Day of July, 2013

Teresa Stanek Rea
*Acting Director of the United States Patent and Trademark Office*

CERTIFICATE OF CORRECTION (continued)
U.S. Pat. No. 8,419,346 B2

In column 6, line 19, please replace "to about 0 mm" with --to about 10 mm--

In column 6, line 43, please replace "harrier may" with --barrier may--

In column 7, line 34, please replace "4.0 ms$^{"1}$" with --4.0 ms$^{-1}$--

In column 7, line 37, please replace "3.5 ms$^{"1}$ and 4.5 ms$^{"1}$" with --3.5 ms$^{-1}$ and 4.5 ms$^{-1}$--

In column 7, line 49, please replace "435 mm. Three sets" with
 --435mm.
   Three sets--

In column 7, line 52, please replace "set using, only" with --set using only--

In column 7, line 54, please replace "FIG. 10, Significantly" with --FIG. 10; significantly--